United States Patent
Yonemura et al.

(10) Patent No.: US 10,036,925 B2
(45) Date of Patent: Jul. 31, 2018

(54) LIQUID CRYSTAL DISPLAY DEVICE

(71) Applicant: Mitsubishi Electric Corporation, Tokyo (JP)

(72) Inventors: Koji Yonemura, Tokyo (JP); Hiroshi Umeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/604,754

(22) Filed: May 25, 2017

(65) Prior Publication Data

US 2017/0261784 A1     Sep. 14, 2017

Related U.S. Application Data

(62) Division of application No. 13/714,196, filed on Dec. 13, 2012.

(30) Foreign Application Priority Data

Dec. 15, 2011   (JP) .................................. 2011-274045

(51) Int. Cl.
  *G02F 1/1339*   (2006.01)
  *G02F 1/1333*   (2006.01)

(52) U.S. Cl.
  CPC ........ *G02F 1/1339* (2013.01); *G02F 1/13394* (2013.01); *G02F 1/133308* (2013.01); *G02F 2001/13396* (2013.01)

(58) Field of Classification Search
  CPC .. G02F 1/1335; G02F 1/13394; G02F 1/1339; G02F 1/1341; G02F 1/13392;
  (Continued)

(56) References Cited

U.S. PATENT DOCUMENTS 6,507,385 B1 *   1/2003   Nishiyama ............ G02F 1/1334
                                                  349/156
6,806,940 B1    10/2004   Noguchi et al.
(Continued)

FOREIGN PATENT DOCUMENTS

CN        1533561 A    9/2004
CN      101142516 A    3/2008
(Continued)

OTHER PUBLICATIONS

The First Office Action issued by the Chinese Patent Office dated Dec. 22, 2014, which corresponds to Chinese Patent Application No. 201210540978.8 and is related to U.S. Appl. No. 13/714,196; with English language partial translation.
(Continued)

*Primary Examiner* — Thoi Duong
(74) *Attorney, Agent, or Firm* — Studebaker & Brackett PC

(57) ABSTRACT

A liquid crystal display device includes: a display panel which includes a TFT array substrate and a CF substrate arranged as opposed to each other, and a liquid crystal held therebetween; and a front panel which is adhered to a front surface side of the display panel with a resin layer interposed therebetween. A display region of the display panel is provided with main spacers formed on the CF substrate and making contact with the TFT array substrate, and sub-spacers formed on the CF substrate and not reaching the TFT array substrate. A ratio of a total contact area of the main spacers and the TFT array substrate with respect to an area of the display region of the liquid crystal panel is equal to or smaller than 0.02%.

7 Claims, 5 Drawing Sheets

(58) Field of Classification Search
CPC ............... G02F 1/1333; G02F 1/13338; G02F 1/133308; G02F 1/133305; G02F 1/133371; G02F 2001/13396; G02F 2001/13415; G02F 2001/13398; G02F 2001/13332; G02F 2001/133311; G02F 2001/133331; G02F 2202/28; G02F 2201/503; G02F 2201/50; B32B 2457/20; B32B 37/12; Y10T 29/49776; Y10T 428/1059
USPC ... 349/155, 156, 153, 12, 189, 58, 158, 138, 349/122; 345/173; 428/1.1, 1.5
See application file for complete search history.

(56) References Cited

U.S. PATENT DOCUMENTS

| | | |
|---|---|---|
| 7,148,944 B2 | 12/2006 | Kinoshita et al. |
| 7,362,409 B2 | 4/2008 | Tamatani et al. |
| 7,518,697 B2 | 4/2009 | Yamada et al. |
| 7,956,967 B2 | 6/2011 | Teramoto |
| 7,969,539 B2 | 6/2011 | Sakurai |
| 8,089,602 B2 | 1/2012 | Yamamoto et al. |
| 8,724,071 B2 | 5/2014 | Hashimoto |
| 2004/0179165 A1 | 9/2004 | Kinoshita et al. |
| 2005/0270472 A1 | 12/2005 | Yamada et al. |
| 2006/0044502 A1 | 3/2006 | Takagi |
| 2007/0030439 A1 | 2/2007 | Kinoshita et al. |
| 2009/0207371 A1 | 8/2009 | Yamamoto et al. |
| 2009/0257010 A1 | 10/2009 | Sakurai |
| 2010/0118254 A1 | 5/2010 | Hashimoto |

FOREIGN PATENT DOCUMENTS

| | | |
|---|---|---|
| CN | 102636914 A | 8/2012 |
| JP | 2002-023164 A | 1/2002 |
| JP | 2003-195317 A | 7/2003 |
| JP | 2003-287759 A | 10/2003 |
| JP | 2006-018238 A | 1/2006 |
| JP | 2006-071750 A | 3/2006 |
| JP | 2007-248983 A | 9/2007 |
| JP | 2009-128399 A | 6/2009 |
| JP | 2009-175701 A | 8/2009 |
| JP | 2009-192757 A | 8/2009 |
| JP | 2009-251550 A | 10/2009 |
| JP | 2010-117385 A | 5/2010 |

OTHER PUBLICATIONS

An Office Action; "Notification of Reason(s) for Refusal," issued by the Japanese Patent Office dated Aug. 4, 2015, which corresponds to Japanese Patent Application No. 2011-274045 and is related to U.S. Appl. No. 13/714,196; with English language partial translation.

An Office Action; "Notification of Reasons for Refusal," issued by the Japanese Patent Office dated Feb. 23, 2016, which corresponds to Japanese Patent Application No. 2011-274045 and is related to U.S. Appl. No. 13/714,196; with English language partial translation.

An Office Action; "Notification of Reason for Rejection" issued by the Japanese Patent Office dated Jun. 6, 2017, which corresponds to Japanese Patent Application No. 2016-195418 and is related to U.S. Appl. No. 15/604,745; with English language concise explanation.

* cited by examiner

F I G . 1
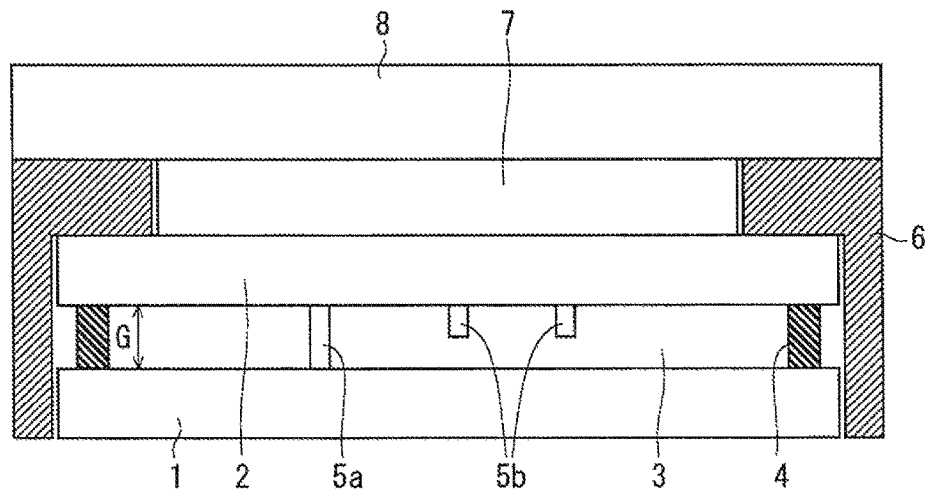
F I G . 2
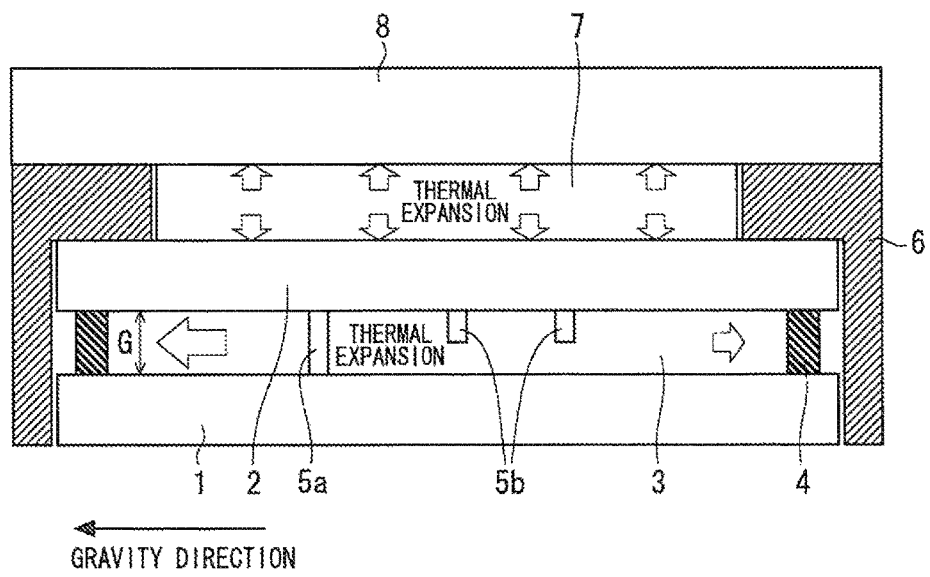

GRAVITY DIRECTION

LIQUID CRYSTAL DISPLAY DEVICE

CROSS-REFERENCE TO RELATED APPLICATIONS

The present application is a Divisional Application of U.S. patent application Ser. No. 13/714,196 filed Dec. 13, 2012, which claims priority to Japanese Patent Application No. 2011-274045 filed Dec. 15, 2011, the contents of which are all herein incorporated by reference in their entirety.

BACKGROUND OF THE INVENTION

Field of the Invention

The present invention relates to a liquid crystal display device formed by providing a protective plate or a touch panel on a front surface side of a display panel.

Description of the Background Art

For example, in a liquid crystal display device for outside installation, a transparent protective plate (protective cover) made of a resin or glass is provided on a front surface (display surface) of a display panel for the purpose of protecting the display panel from an outside shock, and the like. In that case, when an air layer exists between the display panel and the protective plate, there occurs a problem in that extraneous light incident from the front surface side of the display panel is reflected on the front and rear surfaces of the protective plate and the front surface of the display panel, to cause deterioration in visibility. Thus, the space between the display panel and the protective plate may be filled with a transparent resin, or the display panel and the protective plate are adhered to each other with a light-transmissive adhesive sheet made of a resin interposed therebetween.

Further, a liquid crystal display device formed by providing a touch panel on a front surface of a display panel also employs a configuration similar to the above so that an air layer is not formed between the touch panel and the display panel.

As thus described, the liquid crystal display device formed by providing the protective plate or the touch panel (hereinafter referred to as "front panel") on the front surface side of the display panel has the configuration in which the resin layer (injected resin or light-transmissive adhesive sheet) for preventing formation of the air layer is interposed between the display panel and the front panel.

Further, for a liquid crystal display device having a structure in which a front panel is not provided on the front surface side of a display panel, there has been proposed a technique of adjusting a density of columnar spacers that define a cell gap of the display panel for the purpose of preventing display nonuniformity (e.g., Japanese Patent Application Laid-Open No. 2003-287759).

In the liquid crystal display device having the structure in which the front panel such as the touch panel is adhered to the front surface of the display panel (liquid crystal panel) with the resin layer interposed therebetween, there has been a problem in that display nonuniformity is likely to occur in a peripheral part of the liquid crystal panel in a high-temperature environment. This display nonuniformity occurs due to stresses of the liquid crystal panel and the resin layer acting on each other caused by thermal expansion of liquid crystal and the resin layer, and the liquid crystal panel being nonuniformly deformed. In particular, the expanded liquid crystal is likely to flow to the peripheral part of the liquid crystal panel and an amount of the liquid crystal increases in the peripheral part of the liquid crystal panel, thereby causing a cell gap (thickness of the liquid crystal layer) in that portion to become abnormal. This is why display nonuniformity is likely to occur in the peripheral part of the liquid crystal panel.

SUMMARY OF THE INVENTION

An object of the present invention is to obtain, in a liquid crystal display device formed by providing a front panel on a front surface of a liquid crystal panel with a resin layer interposed therebetween, a uniform image by suppressing occurrence of display nonuniformity even in a high-temperature environment.

A liquid crystal display device according to a first aspect of the present invention includes a display panel, a main spacer, and a front panel. The display panel includes a pair of substrates arranged as opposed to each other and a liquid crystal held therebetween. The main spacer is provided on one of the pair of substrates, and makes contact with the other substrate in a display region of the display panel. The front panel is adhered to a front surface side of the display panel with a resin layer interposed therebetween. A ratio of a total contact area of the main spacer and the other substrate with respect to an area of the display region is equal to or smaller than 0.02%.

A liquid crystal display device according to a second aspect of the present invention includes a display panel, a main spacer, and a front panel. The display panel includes a pair of substrates arranged as opposed to each other and a liquid crystal held therebetween. The main spacer is provided on one of the pair of substrates, and makes contact with the other substrate in a display region of the display panel. The front panel is adhered to a front surface side of the display panel with a resin layer interposed therebetween. A compressive deformation amount of the main spacer at a normal temperature is larger than an amount of increase in distance between the pair of substrates due to an influence of thermal expansion of the liquid crystal and the resin layer at an upper limit temperature in an allowable operating temperature range of the liquid crystal display device.

A liquid crystal display device according to a third aspect of the present invention includes a display panel, a front frame, and a front panel. The display panel includes a pair of substrates arranged as opposed to each other and a liquid crystal held therebetween. The front frame is provided on a front surface side of the display panel, and has an opening corresponding to a display region of the display panel. The front panel is provided on a front surface side of the front frame, and is adhered to the display panel with a resin layer interposed therebetween, the resin layer being arranged inside the opening of the front frame. When a thickness of the front frame is Lf and a thickness of the resin layer is Ls, L≥Ls holds at an upper limit temperature in an allowable operating temperature range of the liquid crystal display device.

A liquid crystal display device according to a fourth aspect of the present invention includes a display panel, a front frame, and a front panel. The display panel includes a pair of substrates arranged as opposed to each other and a liquid crystal held therebetween. The front frame is provided on a front surface side of the display panel, and has an opening corresponding to a display region of the display panel. The front panel is provided on a front surface side of the front frame, and is adhered to the display panel with a resin layer interposed therebetween, the resin layer being arranged inside the opening of the front frame. When a thermal expansion amount of a thickness of the front frame is ΔLf and a thermal expansion amount of a thickness of the resin layer is ΔLs in the case where a temperature of the liquid crystal display device rises from a normal temperature, ΔLf≥ΔLs holds.

According to the present invention, in the liquid crystal display device having the structure in which the front panel is adhered to the front surface side of the display panel with the resin layer interposed therebetween, even when the liquid crystal and the resin layer expand at a high temperature, gathering of the liquid crystal in a certain place (e.g., the peripheral part or the central part) of the liquid crystal panel can be suppressed. Since the distance (cell gap) between the pair of substrates of the liquid crystal panel can be held uniform, occurrence of display nonuniformity can be suppressed so that a uniform display can be obtained.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a liquid crystal display device according to a first preferred embodiment;

FIG. 2 is a view for describing a problem with the liquid crystal display device having a front panel;

DESCRIPTION OF THE PREFERRED EMBODIMENTS

First Preferred Embodiment

Figure 3:
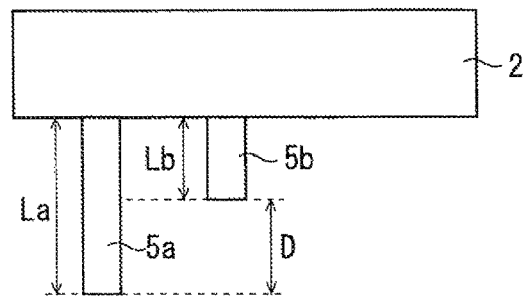
FIG. 3 is a view showing a main spacer and a sub spacer provided in the liquid crystal display device according to the first preferred embodiment (before formation of a liquid crystal panel)

FIG. 1 is a view showing a configuration of a principle part of a liquid crystal display device according to a first preferred embodiment of the present invention. As in FIG. 1, a display panel (liquid crystal panel) of the liquid crystal display device has a structure in which a liquid crystal 3 is held between a thin-film transistor (TFT) array substrate 1 and a color filter (CF) substrate 2 arranged on a front surface (display surface) side thereof as opposed thereto.

Although not illustrated, the TFT array substrate 1 is formed by providing, on a transparent substrate such as glass, a pixel electrode of each pixel, a TFT for supplying an image signal to each pixel electrode, a gate wire (scanning signal line) for supplying a drive signal to a gate electrode of each TFT, a source wire (image signal line) for supplying an image signal to a source electrode of the TFT, and the like. Further, the CF substrate 2 is formed by providing, on the rear-side surface (surface opposed to the TFT array substrate 1) of a transparent substrate such as glass or a resin, a black matrix as a light-blocking film for blocking light among pixels, a color filter for defining a color of each pixel, and the like.

The TFT array substrate 1 and the CF substrate 2 are adhered to each other with a peripheral seal 4 applied to and formed in the peripheral part of the liquid crystal panel interposed therebetween, and the liquid crystal 3 is sealed within a region surrounded by the peripheral seal 4. Further, a display region in the liquid crystal panel is provided with columnar main spacers 5a that define a cell gap G which is a distance between the TFT array substrate 1 and the CF substrate 2 (thickness of the liquid crystal 3).

Moreover, the liquid crystal panel of the present preferred embodiment is provided with columnar sub-spacers 5b having a height smaller than that of the main spacers 5a, in addition to the main spacers 5a. The sub-spacers 5b prevent the CF substrate 2 and the TFT array substrate 1 from coming into contact with each other and damage the display cell when a large pressure is locally applied to the liquid crystal panel. Although the main spacers 5a and the sub-spacers 5b may be formed on either the TFT array substrate 1 side or the CF substrate 2 side, they are to be formed on the CF substrate 2 side in the present preferred embodiment.

The front surface side of the liquid crystal panel is mounted with a frame-like front frame 6 having an opening corresponding to the display region of the liquid crystal panel. To the front surface side of the front frame 6, a front panel 8 such as a protective plate or a touch panel is adhered so as to cover the display surface of the liquid crystal panel. A resin layer 7 made of an injected resin, a light-transmissive adhesive sheet, or the like is provided between the front panel 8 and the liquid crystal panel (CF substrate 2), that is, inside the opening of the front frame 6 in order to prevent an air layer from being formed in that portion.

As shown in FIG. 1, with the liquid crystal display device having the liquid crystal panel, to which the front panel 8 is adhered with the resin layer 7 interposed therebetween, there has been a problem in that display nonuniformity is likely to occur in the peripheral part of the liquid crystal panel in a high-temperature environment, and uniformity in image quality thus cannot be held. This problem is mainly attributable to thermal expansion of the liquid crystal 3 and the resin layer 7. This problem will be described with reference to FIG. 2.

When a temperature of the liquid crystal display device rises and the liquid crystal 3 expands, the liquid crystal 3 tries to push up the CF substrate 2. However, since a force to push down the CF substrate 2 acts on the central part of the liquid crystal panel from the resin layer 7 due to expansion of the resin layer 7 on the CF substrate 2, the liquid crystal 3 with an increased volume gathers in the peripheral part of the liquid crystal panel, where the force applied from the resin layer 7 is weak.

This results in an increase in the cell gap G in the peripheral part of the liquid crystal panel. Although the main spacers 5a are pressed against the TFT array substrate 1 at a normal temperature, a compressive deformation amount of the main spacers 5a reaches zero with time in a portion where the cell gap G has become larger due to the influence of thermal expansion of the liquid crystal 3 and the resin layer 7. Then, the liquid crystal 3 begins to fall downward (in a gravity direction), and the cell gap G becomes large especially in a lower side part of the liquid crystal panel. This portion in which the cell gap G has become abnormally large is viewed as display nonuniformity, to impair uniformity of the image quality.

Figure 4:
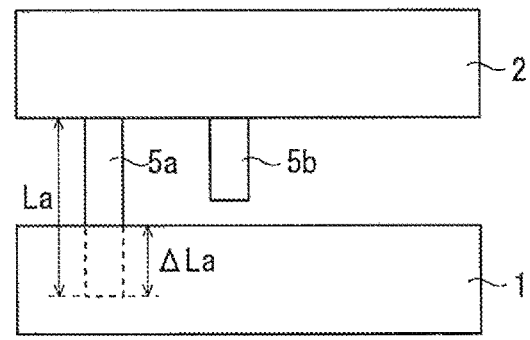
FIG. 4 is a view showing the main spacer and the sub spacer provided in the liquid crystal display device according to the first preferred embodiment (after formation of the liquid crystal panel)

In the present preferred embodiment, the compressive deformation amount of the main spacer 5a is defined in consideration of a change in the cell gap G due to expansion of the liquid crystal 3 and the resin layer 7. FIG. 3 shows the main spacer 5a and the sub-spacer 5b in an initial state of the CF substrate 2 alone (before being adhered to the TFT array substrate 1), and FIG. 4 shows the main spacer 5a and the sub-spacer 5b in a state where the CF substrate 2 has been adhered to the TFT array substrate 1 to form the liquid crystal panel.

As in FIG. 3, a height La of the main spacer 5a is larger than a height Lb of the sub-spacer 5b. When the TFT array substrate 1 and the CF substrate 2 are adhered to each other, the main spacer 5a is pressed against the TFT array substrate 1, and is compressed in a height direction just by a predetermined amount (compressive deformation amount $\Delta La$) as in FIG. 4. The sub-spacer 5b is formed with a height that does not come into contact with the TFT array substrate 1 in a normal state, so as to come into contact with the TFT array substrate 1 for the first time when a large pressure is applied to the liquid crystal panel. That is, a difference D between the height La of the main spacer 5a and the height Lb of the sub-spacer 5b is set larger than the compressive deformation amount $\Delta La$.

In the present preferred embodiment, the compressive deformation amount $\Delta La$ of the main spacers 5a from its initial state (state of its length being La) is determined in consideration of (i) an amount of change in the cell gap G due to thermal expansion of the liquid crystal 3 and (ii) an amount of change in the cell gap G due to the influence of thermal expansion of the resin layer 7.

Specifically, the compressive deformation amount $\Delta La$ of the main spacers 5a is set to be equal to or larger than the sum of an amount of increase in the cell gap G due to thermal expansion of the liquid crystal 3 and an amount of increase in the cell gap G due to the influence of a thermal expansion of the resin layer 7. That is, the compressive deformation amount $\Delta La$ of the main spacers 5a at a normal temperature is set to be large to such a degree that, even when an ambient temperature is a predetermined high temperature (upper limit temperature in an allowable operating temperature range of the liquid crystal display device) and a portion with the increased cell gap G (especially the peripheral portion of the liquid crystal panel) is generated due to thermal expansion of the liquid crystal 3 and the resin layer 7, the compressive deformation amount $\Delta La$ of the main spacers 5a does not become zero in that portion.

However, the compressive deformation amount $\Delta La$ of the main spacers 5a is set to be smaller than the difference D between the height La of the main spacers 5a and the height Lb of the sub-spacers 5b such that the sub-spacers 5b do not come into contact with the TFT array substrate 1 in a normal state.

Figure 5:
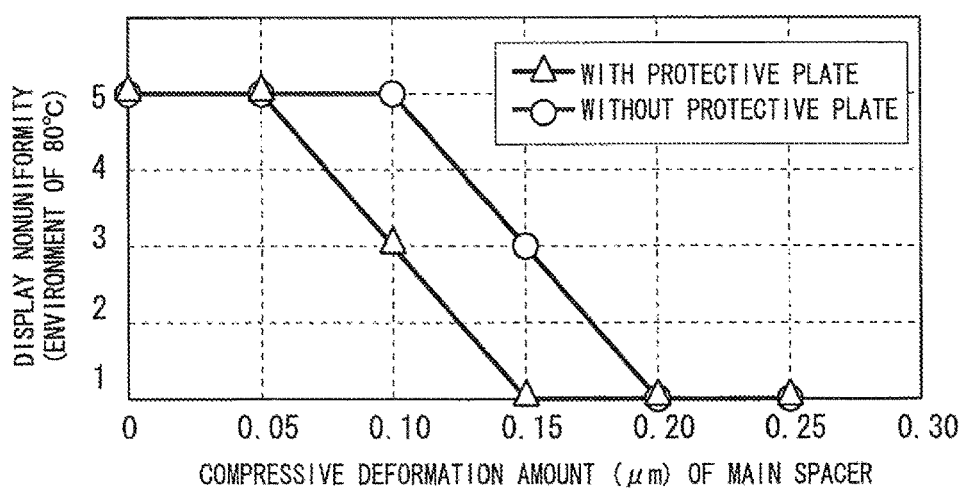
FIG. 5 is a graph of experiment results showing a relation between a compressive deformation amount of the main spacers and a degree of display nonuniformity.

The present inventor has set a liquid crystal display device at a high temperature (upper limit temperature in the allowable operating temperature range of the liquid crystal display device; e.g., 80° C.), and conducted an experiment to verify the relation between the compressive deformation amount $\Delta La$ of the main spacers 5a and the display nonuniformity. FIG. 5 is a graph showing results of the experiment. A horizontal axis of the graph of FIG. 5 is the compressive deformation amount $\Delta La$ of the main spacers 5a, and a vertical axis is a value obtained by grading a thickness of display nonuniformity in five stages, and a larger numerical value indicates a larger thickness of the display nonuniformity (5 indicates "very thick", and 1 indicates "completely non-viewable").

The experiment was conducted on a liquid crystal display device having the front panel 8 and the resin layer 7, and on a liquid crystal display device without the front panel 8 and the resin layer 7. Further, in the experiment, the predetermined high temperature was set to 80° C., and a liquid crystal panel in a horizontal electric field mode was used. Further, in the liquid crystal panel used in the experiment, a thermal expansion coefficient of the liquid crystal 3 is $7.46\times10^{-1}/K$, and the cell gap G at a normal temperature is 3.5 μm. In this case, in the environment of 80° C., an amount of increase in the cell gap G in the liquid crystal panel without the front panel 8 and the resin layer 7 is 0.15 μm.

As shown in FIG. 5, in the liquid crystal display device not having the front panel 8 and the resin layer 7, display nonuniformity was viewed when the compressive deformation amount $\Delta La$ of the main spacers 5a was smaller than 0.15 μm, whereas display nonuniformity was not viewed when the compressive deformation amount $\Delta La$ was equal to or larger than 0.15 μm. On the other hand, in the liquid crystal display device having the front panel 8 and the resin layer 7, display nonuniformity was not viewed when the compressive deformation amount $\Delta La$ of the main spacers 5a was equal to or larger than 0.2 μm. That is, when the liquid crystal display device has the front panel 8 and the resin layer 7, the compressive deformation amount $\Delta La$ of the main spacers 5a needs to be made larger by 0.05 μm than that in the case of the liquid crystal display device without the front panel 8 and the resin layer 7, in order to suppress occurrence of display nonuniformity. This means that the amount of increase in the cell gap G due to the influence of thermal expansion of the resin layer 7 was 0.05 μm.

It is found from the above that, in order to suppress display nonuniformity attributable to thermal expansion of the liquid crystal 3 and the resin layer 7, it is effective to set the compressive deformation amount $\Delta La$ of the main spacers 5a to equal to or larger than the sum (0.2 μm) of an amount of increase in the cell gap G (0.15 μm) due to thermal expansion of the liquid crystal 3 and an amount of increase in the cell gap G (0.05 μm) due to the influence of thermal expansion of the resin layer 7.

However, the pressure inside the liquid crystal panel becomes negative when the main spacers 5a become large, and occurrence of display nonuniformity considered to be caused by residual stress was confirmed especially when a display was made in black. This display nonuniformity is likely to obviously appear in a liquid crystal display device in the mode of driving a liquid crystal by means of a horizontal electric field (electric field horizontally oriented to the TFT array substrate 1), such as an IPS (In Plane Switching) mode or an FFS (Fringe Field Switching) mode. Hereinafter, this display nonuniformity attributable to residual stress inside the liquid crystal display device is referred to as "stress nonuniformity".

Stress nonuniformity is considered to be caused by occurrence of a phase difference in glass due to a photo-elastic effect, which is attributable to residual stress in the liquid crystal panel. In that case, light passing occurs even when two polarization plates provided in the liquid crystal panel are arranged in crossed nicols, and hence display nonuniformity (stress nonuniformity) appears in accordance with a distribution of the residual stress. It is considered that stress nonuniformity appeared in the liquid crystal display device of the present preferred embodiment because increase in the compressive deformation amount ΔLa of the main spacer 5a led to the increased compressive stress of the main spacer 5a and the larger residual stress.

Figure 6:
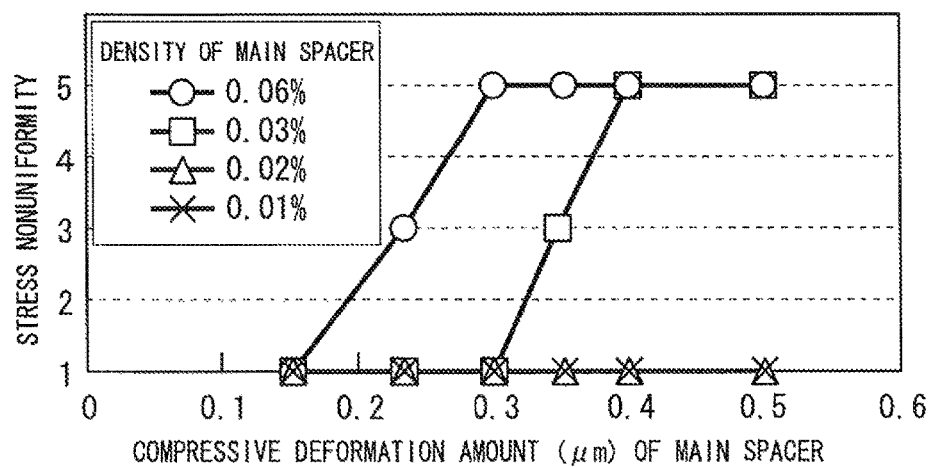
FIG. 6 is a graph of experiment results showing the relation between the compressive deformation amount of the main spacers and a degree of stress nonuniformity.

Thereat, in order to reduce the compression pressure of the main spacer 5a, the present inventor conducted a study of decreasing an area proportion of the main spacer 5a (ratio of a total contact area of the main spacers 5a and the TFT array substrate 1 with respect to an area of the display region of the liquid crystal panel), and conducted an experiment of verifying the relation between the area proportion of the main spacer 5a and the degree of stress nonuniformity. FIG. 6 is a graph showing results of the experiment. A horizontal axis of the graph of FIG. 6 is the compressive deformation amount ΔLa of the main spacer 5a, and a vertical axis is a value obtained by grading a thickness of stress nonuniformity in five stages, and a larger numerical value indicates a larger thickness of the display nonuniformity (5 indicates "very thick", and 1 indicates "completely non-viewable").

In this experiment, a change in thickness of stress nonuniformity at the time of changing the compressive deformation amount ΔLa of the main spacer 5a was observed with respect to each of liquid crystal display devices with the area proportion of the main spacers 5a (main spacer density) being from 0.01% to 0.06%. In the liquid crystal display device used in the experiment, the difference D between the height La of the main spacers 5a and the height Lb of the sub-spacers 5b in the initial state (state where the CF substrate 2 is not adhered to the TFT array substrate 1) is 0.5 μm.

As a result of the experiment, it was found that, as shown in FIG. 6, when the area proportion of the main spacers 5a is equal to or smaller than 0.02%, stress nonuniformity does not occur even if the compressive deformation amount ΔLa of the main spacers 5a is increased. Hence, in the present preferred embodiment, the area proportion of the main spacers 5a is preferably set equal to or smaller than 0.02%, so as to suppress occurrence of stress nonuniformity.

Second Preferred Embodiment

Figure 7:
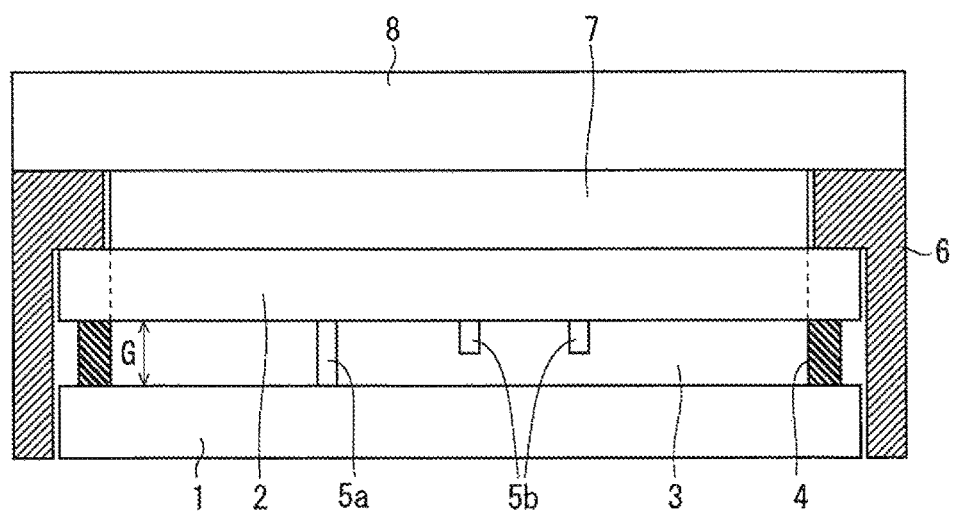
FIG. 7 is a structural view of a liquid crystal display device according to a second preferred embodiment.

FIG. 7 is a view showing a configuration of a liquid crystal display device according to a second preferred embodiment. In the present preferred embodiment, the configuration is formed in which the resin layer 7 between the front panel 8 and the liquid crystal panel extends to the above of the peripheral seal 4 of the liquid crystal panel. Other configurations are similar to those of the first preferred embodiment, and descriptions thereof are thus omitted herein.

In the present preferred embodiment, since the whole of the region filled with the liquid crystal 3 is covered by the resin layer 7, a force of the resin layer 7 to push down the CF substrate 2 at the time of thermal expansion of the resin layer 7 is applied almost uniformly to the whole of the liquid crystal 3. Hence, the liquid crystal 3 is prevented from gathering in the peripheral part of the liquid crystal panel. This can result in prevention of the cell gap G in the peripheral part of the liquid crystal panel from becoming particularly large, to thereby suppress occurrence of display nonuniformity in that portion. Hence, occurrence of display nonuniformity can be further suppressed than in the first preferred embodiment.

Although FIG. 7 shows the configuration in which the end of the resin layer 7 above the peripheral seal 4 is located so as to overlap the inner end of the peripheral seal 4, the above effect can be obtained at least when the resin layer 7 extends to the above of the peripheral seal 4 and the whole of the region filled with the liquid crystal 3 is covered by the resin layer 7. Therefore, a configuration may be formed in which the resin layer 7 extends more outward than the inner end of the peripheral seal 4 and part or the whole of the resin layer 7 overlaps the peripheral seal 4, and also in that case, a similar effect can be obtained.

First Modified Example

As described in the first preferred embodiment with reference to FIG. 2, the liquid crystal 3 is likely to flow in the gravity direction, and the cell gap G is likely to increase especially in the lower side part of the liquid crystal panel. For this reason, in the liquid crystal display device according to the second preferred embodiment, it is possible to suppress an increase in the cell gap G in the peripheral part of the liquid crystal panel at least when the resin layer 7 extends to the above of the peripheral seal 4 in the gravity direction.

Figure 8:
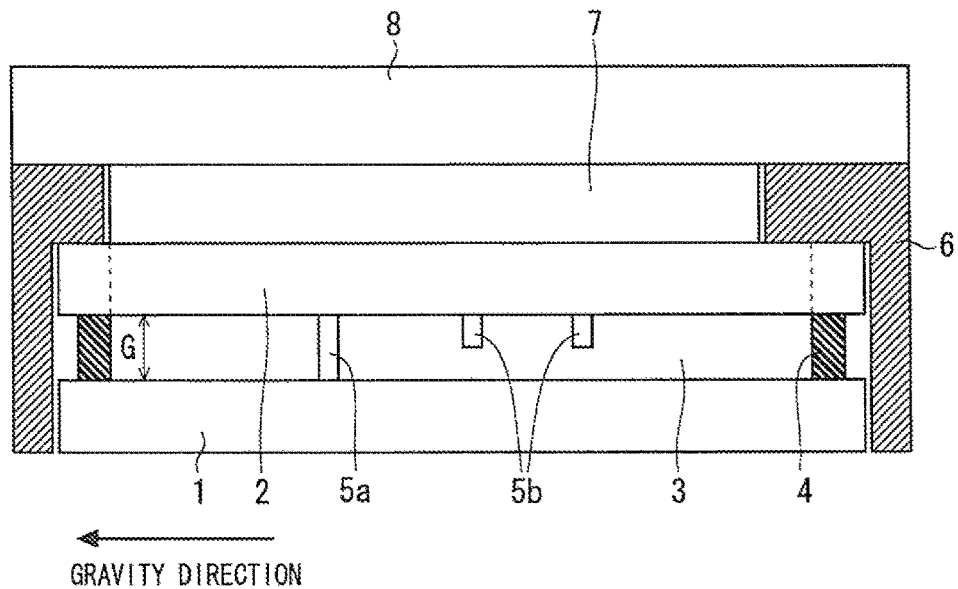
FIG. 8 is a view showing a first modified example of a liquid crystal display device according to the second preferred embodiment.

Therefore, as shown in FIG. 8, the end of the resin layer 7 on the opposite side to the gravity direction (upper side) may be configured so as not to extend to the above of the peripheral seal 4. In this case, the liquid crystal 3 is more likely to flow to the upper side portion of the liquid crystal panel, but when the cell gap G increases and the compressive deformation amount ΔLa of the main spacers 5a comes close to zero, the liquid crystal 3 moves downward in accordance with the gravity, and hence the cell gap G no longer increases.

Second Modified Example

In the second preferred embodiment, as the peripheral seal 4 or a gap member (spacer) to be mixed in the peripheral seal 4, one having a higher thermal expansion coefficient than that of the liquid crystal 3 may be used. Specifically, in the whole of the allowable operating temperature range of the liquid crystal display device, or at least in the vicinity (e.g. 80 degrees) of the upper limit temperature in the allowable operating temperature range, the thermal expansion amount in the thickness direction of the liquid crystal display device in the peripheral seal 4 is preferably equivalent to the thermal expansion amount in the same direction in the liquid crystal 3.

As described above, in the liquid crystal display device of FIG. 7, a force due to thermal expansion of the resin layer 7 is applied almost uniformly to the whole of the liquid crystal 3 when the device is placed in a high-temperature environment. At this time, when an expansion amount of the peripheral seal 4 is smaller than an expansion amount of the liquid crystal 3, an increase in the cell gap G in the vicinity of the peripheral seal 4 is suppressed, and on the contrary to FIG. 2, the liquid crystal 3 is likely to gather in the central part of the liquid crystal panel. As a result, the cell gap G in the central part of the liquid crystal panel may become particularly large, and display nonuniformity may appear in that portion.

According to the present modified example, the peripheral seal 4 expands to the same degree as the liquid crystal 3, leading to uniform expansion of the liquid crystal 3 in the whole of the liquid crystal panel. Hence, the liquid crystal 3 prevents the cell gap G in the central part of the liquid crystal panel from becoming particularly large, so as to further suppress occurrence of display nonuniformity.

Third Preferred Embodiment

Figure 9:
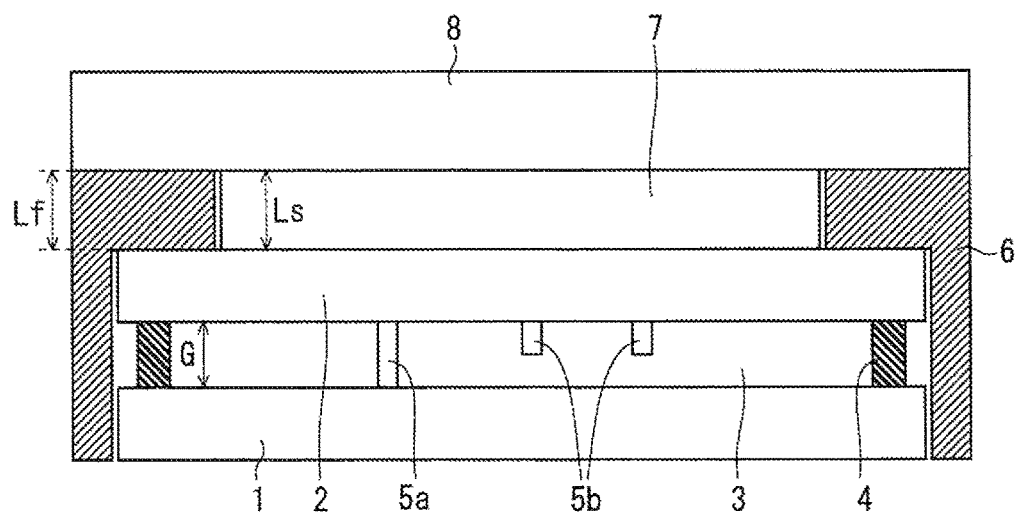
FIG. 9 is a structural view of a liquid crystal display device according to a third preferred embodiment.

FIG. 9 is a view showing a configuration of a liquid crystal display device according to a third preferred embodiment. In the present preferred embodiment, a thickness Lf of the front frame 6 on the front surface side of the liquid crystal display device and a thickness Ls of the resin layer 7 are set and materials therefor are selected such that the relation between those thicknesses becomes Lf Ls in the whole of the allowable operating temperature range of the liquid crystal display device, or at least in the vicinity (e.g. 80 degrees) of the upper limit temperature in the allowable operating temperature range of the liquid crystal display device.

According to the present preferred embodiment, at least in the vicinity of the upper limit temperature in the allowable operating temperature range of the liquid crystal display device, application of the pressure from the resin layer 7 to the liquid crystal panel is prevented even if the resin layer 7 thermally expands. Hence, the liquid crystal 3 uniformly expands and the cell gap G in the peripheral part of the liquid crystal panel becomes particularly large, to allow prevention of display nonuniformity from occurring in that portion.

Fourth Preferred Embodiment

Figure 10:
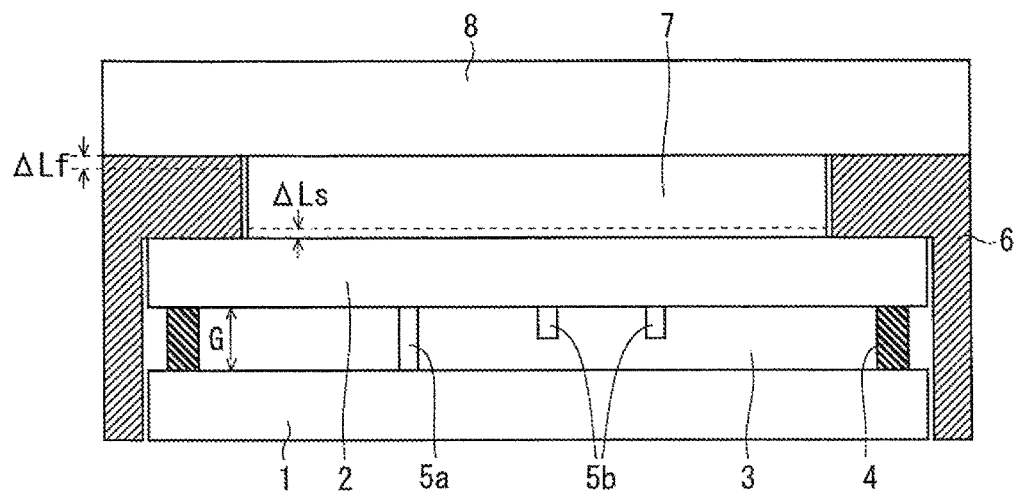
FIG. 10 is a structural view of a liquid crystal display device according to a fourth preferred embodiment.

FIG. 10 is a view showing a configuration of a liquid crystal display device according to a fourth preferred embodiment. In the present preferred embodiment, a thickness of the front frame 6 on the front surface side of the liquid crystal display device and a thickness of the resin layer 7 are set and materials therefor are selected such that the relation between a thermal expansion amount $\Delta Lf$ in the thickness direction of the front frame 6 and a thermal expansion amount $\Delta Ls$ in the thickness direction of the resin layer 7 becomes $\Delta Lf \geq \Delta Ls$ when a temperature of the liquid crystal display device rises from a normal temperature. These $\Delta Lf$ and $\Delta Ls$ are each obtained by a product of a linear expansion coefficient (physicality value specific to the material) of the front frame 6 or the resin layer 7, the thickness thereof, and a temperature difference (=linear expansion coefficient×thickness×temperature difference).

According to the present preferred embodiment, even when the thickness of the resin layer 7 is originally large and the pressure is applied from the resin layer 7 to the liquid crystal 3 even in a normal-temperature state, the front frame 6 thermally expands more than the resin layer 7 when the temperature rises, and the pressure thus decreases. This leads to suppression of the pressure that is applied from the thermally expanded resin layer 7 to the liquid crystal panel in the high-temperature environment (vicinity of the upper limit temperature in the allowable operating temperature range of the liquid crystal display device). Hence, the liquid crystal 3 uniformly expands and the cell gap G in the peripheral part of the liquid crystal panel becomes particularly large, to allow prevention of display nonuniformity from occurring in that portion.

Fifth Preferred Embodiment

Figure 11:
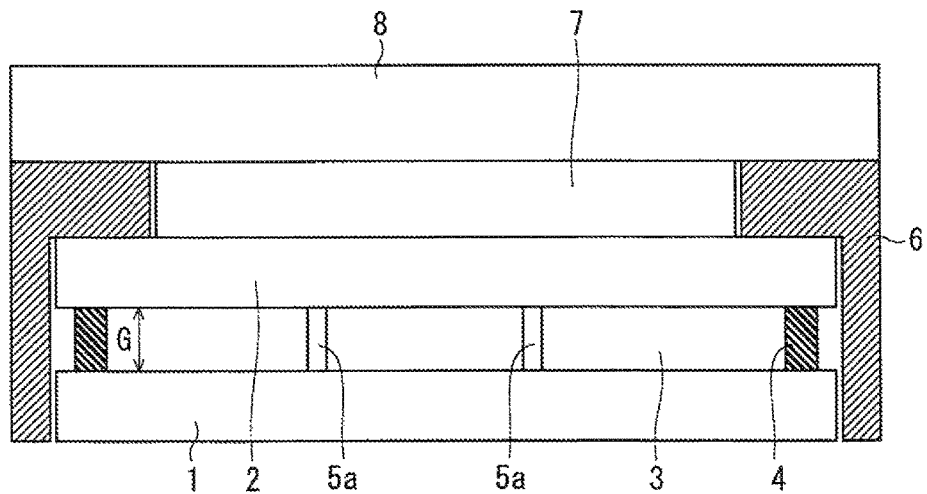
FIG. 11 is a structural view of a liquid crystal display device according to a fifth preferred embodiment.

In each of the above preferred embodiments, the configuration (dual spacer structure) has been formed in which the sub-spacers 5b for protecting the display cell from local application of a large pressure is provided between the TFT array substrate 1 and the CF substrate 2 in addition to the main spacers 5a. However, in the liquid crystal display device according to the present invention, since the front panel 8 is provided on the front surface side, local application of a pressure to the liquid crystal panel is alleviated even when a finger or a pen-type pointer comes into contact with the front surface of the liquid crystal display device, and hence the sub-spacers 5b may be omitted as shown in FIG. 11. This can lead to reduction in manufacturing cost of the liquid crystal display device.

However, the area proportion of the main spacers 5a is preferably held equal to or smaller than 0.02% as in the first preferred embodiment so as to prevent occurrence of stress nonuniformity.

In the present invention, each of the preferred embodiments can be freely combined, or can be appropriately modified or omitted, within the range of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
   a display panel which includes a pair of substrates arranged as opposed to each other and a liquid crystal held therebetween;
   a main spacer which is provided on one substrate of said pair of substrates, and makes contact with the other substrate in a display region of said display panel; and
   a front panel which is adhered to a front surface side of said display panel with a resin layer interposed therebetween, wherein
   a ratio of a total contact area of said main spacer and the other substrate with respect to an area of said display region is equal to or smaller than 0.02%, and
   a compressive deformation amount of said main spacer at a normal temperature is larger than an amount of increase in distance between said pair of substrates due to an influence of thermal expansion of said liquid crystal and said resin layer at an upper limit temperature in an allowable operating temperature range of said liquid crystal display device.

2. The liquid crystal display device according to claim 1, further comprising
   a sub-spacer which is provided on said one substrate in the display region of said display panel, has a smaller height than that of said main spacer, and does not come into contact with said other substrate.

3. The liquid crystal display device according to claim 1, wherein
   said liquid crystal is sealed between said pair of substrates by means of a peripheral seal formed in a peripheral part of said display panel, and
   said resin layer extends to above a position where said peripheral seal is formed on the front surface side of said display panel.

4. The liquid crystal display device according to claim 3, wherein
   a thermal expansion amount in a thickness direction of said display panel in said peripheral seal or a gap member included inside said peripheral seal is equivalent to a thermal expansion amount in a thickness direction of said display panel in said liquid crystal at an upper limit temperature in an allowable operating temperature range of said liquid crystal display device.

5. The liquid crystal display device according to claim 1, wherein
said display panel drives said liquid crystal by a horizontal electric field mode.

6. The liquid crystal display device according to claim 1, wherein
said front panel is a protective plate made of glass or a resin, or a touch panel.

7. The liquid crystal display device according to claim 1, further comprising
a front frame which is provided on a front surface side of said display panel and has an opening corresponding to a display region of said display panel, wherein
said resin layer is arranged inside said opening of said front frame, and
said front panel is provided on a front surface side of said front frame and adhered to said display panel with both of said resin layer and said front frame interposed therebetween.

* * * * *